United States Patent [19]
Cummins et al.

[11] Patent Number: 5,304,978
[45] Date of Patent: Apr. 19, 1994

[54] RESISTOR GRID ASSEMBLY HAVING "U" BEND RESISTOR ELEMENTS

[75] Inventors: Robert Cummins; William Benson, both of Pittsburgh, Pa.; Victor V. Kirilloff, Lincoln, Nebr.

[73] Assignee: Mosebach Manufacturing Company, Pittsburgh, Pa.

[21] Appl. No.: 3,591

[22] Filed: Jan. 13, 1993

Related U.S. Application Data

[63] Continuation-in-part of Ser. No. 927,452, Aug. 10, 1992.

[51] Int. Cl.$^5$ ............................................. H01C 3/00
[52] U.S. Cl. ................................. 338/280; 338/281; 338/283; 338/284
[58] Field of Search ............... 338/280, 279, 281, 283, 338/284, 329, 324, 333

[56] References Cited

U.S. PATENT DOCUMENTS

| | | | |
|---|---|---|---|
| 2,969,516 | 1/1961 | Du Bois | 338/284 |
| 3,697,923 | 10/1972 | Griffes | 338/280 |
| 4,100,526 | 7/1978 | Kirilloff et al. | |
| 4,553,126 | 11/1985 | Brandstäter et al. | 338/280 X |
| 4,651,124 | 3/1987 | Kirilloff et al. | |
| 4,651,125 | 3/1987 | Harkness | |
| 4,654,627 | 3/1987 | Harkness | |
| 5,045,831 | 9/1991 | Kirilloff et al. | 338/280 |
| 5,049,852 | 9/1991 | Cummins et al. | |
| 5,068,637 | 11/1991 | Bayer | |
| 5,159,310 | 10/1992 | Cummins et al. | 338/280 |

*Primary Examiner*—Marvin M. Lateef
*Attorney, Agent, or Firm*—Buchanan Ingersoll

[57] ABSTRACT

A heat dissipating fabricated resistor grid for the dynamic braking of electric motors has a zigzag resistor supported by insulating members within a frame. The zigzag resistor is made up of a plurality of resistor elements formed from sheet metal, each element containing at least one "U" shaped bend, that are connected by welded joints between the legs of adjacent resistor elements. The resistor elements may be embossed to stiffen them. Various types of clips may be utilized to hold the tabs and the resistor elements together to facilitate welding and the clips are welded to the other components and become part of the zigzag resistor. Various types of connecting joints are provided to connect the zigzag resistor to the insulating members. Various types of securing devices are provided to secure the insulating members to a supporting metal frame.

54 Claims, 11 Drawing Sheets

RESISTOR GRID ASSEMBLY HAVING "U" BEND RESISTOR ELEMENTS

This is a continuation-in-part of Ser. No. 927,452 filed Aug. 10, 1992.

BACKGROUND OF THE INVENTION

1. Field of the Invention

This invention relates to electrical resistor assemblies incorporating a plurality of forced ventilated resistor grids that are used in the dynamic braking or retarding function of large electric motors such as the direct current traction motors on diesel electric locomotives. The resistor grid of the present invention has a zigzag resistor that is formed from a plurality of resistor elements that are connected to each other by welded joints of various types.

During dynamic braking of a diesel electric locomotive, its traction motors operate in a generating mode and supply current to heavy duty resistor grids where the electrical energy is converted to heat and dissipated to the atmosphere with the aid of cooling fans. The zigzag resistor elements must be able to withstand the high temperatures and vibration inherent in being utilized on locomotives. Further, in order to be economically useful, the resistor grids must be efficiently assembled and be easily replaceable in use.

2. Description of the Prior Art

Conventionally, the resistor element within the resistor grid is made up of a folded or zigzag strip or strips of resistance material mounted in the grid frame. The resistor strip may be a unitary fan folded strip as is shown in U.S. Pat. No. 4,100,526 and U.S. Pat. No. 4,651,124. The resistor element may also be formed from a series of short sections that are welded together as shown in U S. Pat. No. 4,651,125; U.S. Pat. No. 4,654,627; U.S. Pat. No. 5,068,637; and U.S. Pat. No. 5,049,852.

The present invention is directed to an improved resistor grid that has the zigzag strip made up of a plurality of resistor elements which are joined to each other by welded joints.

SUMMARY OF THE INVENTION

In accordance with the present invention, there is provided a fabricated resistor grid including a frame having spaced apart first and second insulating members that support a zigzag resistor. The zigzag resistor includes a plurality of resistor elements formed of sheet metal having at least one "U" shaped bend in each element. The resistor elements are connected by welded joints to each other to form the zigzag resistor. A first type of connecting means is provided to connect the "U" shaped bends of the resistor to the first and second insulating members. A second type of connecting means is provided to connect the welded joints of the zigzag resistor to the first and second insulating members so that the continuous zigzag resistor is supported between the first and second insulating members.

Further, in accordance with the present invention, there is provided a fabricated resistor grid that includes a frame having spaced apart first and second insulating members that support a zigzag resistor. The zigzag resistor includes a plurality of "U" shaped elements formed of sheet metal oriented with the closed end of the "U" of each element adjacent the first insulating member and the open end of the "U" of each element adjacent the second insulating member. Connecting means are provided to connect the closed end of each of the "U" shaped elements to the first insulating member. A plurality of metal tabs having a thickness greater than the thickness of the sheet metal forming the "U" shaped elements are welded between adjacent "U" shaped elements. The tab ends of the "U" shaped elements are connected to the second insulating member. The metal tabs each electrically connect two adjacent "U" shaped elements to each other.

Still further, in accordance with the present invention, the resistor elements and metal tabs of the zigzag resistors may be connected with metal clips prior to welding to facilitate the welding process. The metal clips are then welded to the resistor elements and the tabs and become a permanent part of the zigzag resistor.

Accordingly, a principal object of the present invention is to provide an improved fabricated resistor grid for use in the dynamic braking of electric motors.

Another object of the present invention is to provide a zigzag resistor for the resistor grid that is formed from a plurality of "U" shaped resistor elements that are identical to each other and may be readily fabricated into a zigzag resistor.

Another object of the present invention is to provide a zigzag resistor for the resistor grid that is formed from a plurality of resistor elements each having at least one "U" shaped bend that are connected by welded joints.

Another object of the present invention is to provide a zigzag resistor that is formed from "U" shaped elements welded to metal tabs that are substantially thicker than the "U" shaped elements and serve as a heat sink to reduce the heat transfer from the resistor strip to the insulating material which supports the strip.

These and other objects of the present invention will be more completely disclosed and described in the following specification, accompanying drawings and the appended claims.

DESCRIPTION OF THE PREFERRED EMBODIMENTS

Referring to the drawings, and particularly to FIGS. 1-5, there is shown a portion of a zigzag resistor indicated generally at 8. The zigzag resistor 8 is formed from a plurality of identical "U" shaped elements 10 that are connected by metal tabs 12 that are welded between the legs 16 of adjacent "U" shaped elements 10. The closed ends 14 of each element 10 are oriented in the same direction.

Figure 3:
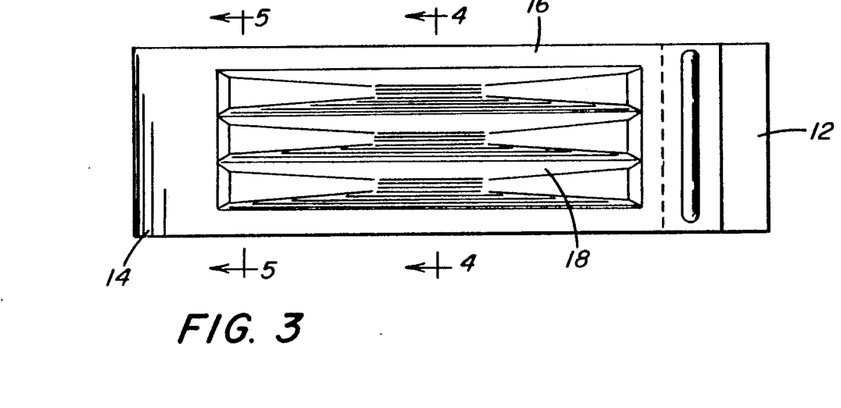
FIG. 3 is top plan view of a "U" shaped element of the present invention that is embossed to stiffen it.
Figure 4:
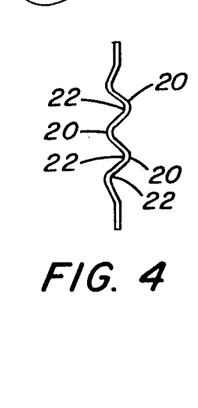
FIG. 4 is a sectional view taken along line 4—4 of FIG. 3.
Figure 5:
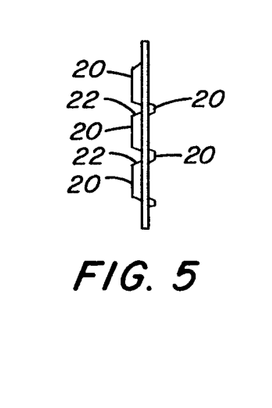
FIG. 5 is a sectional view taken along line 5—5 of FIG. 3.

As shown in FIGS. 3, 4 and 5, the legs 16 of each element 10 may be embossed with lands 20 and grooves 22 to stiffen the legs 16 of each of the "U" shaped elements 10. Depending upon the size of the resistor element, the amount of heat to which it will be exposed, and the thickness of the sheet metal of the "U" shaped elements 10, the embossment may or may not be placed upon the legs 16.

Figure 1:
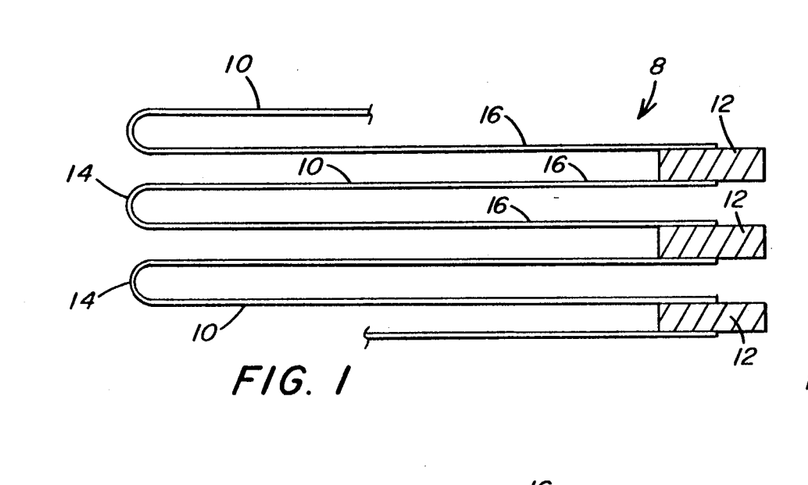
FIG. 1 is a side elevation of a portion of a zigzag resistor of the present invention.
Figure 2:
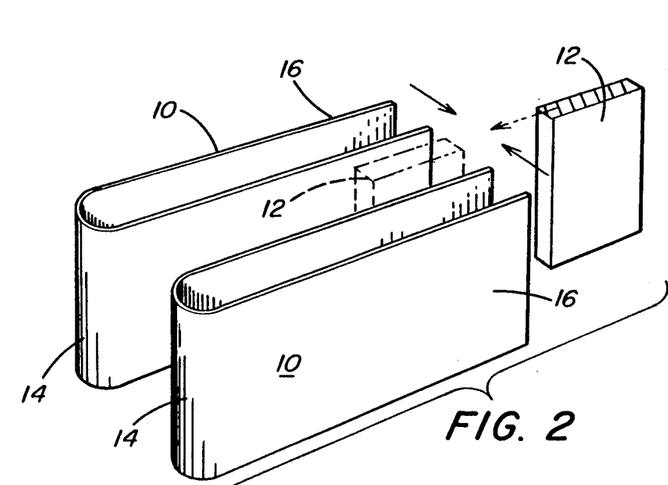
FIG. 2 is an exploded perspective view of two "U" shaped elements of the present invention with the metal tab that is ultimately welded between them.

As best seen in FIG. 1, the metal tabs 12 are substantially thicker than the sheet metal from which the "U" shaped resistor elements 10 are formed. The thickness of the tabs 12 provides a heat sink for the zigzag resistor to inhibit passage of heat to the insulator that holds the zigzag resistor and also provides spacing between the individual legs 16 of adjacent "U" shaped resistor elements 10.

Figures 6, 7, 8, 15, 16:
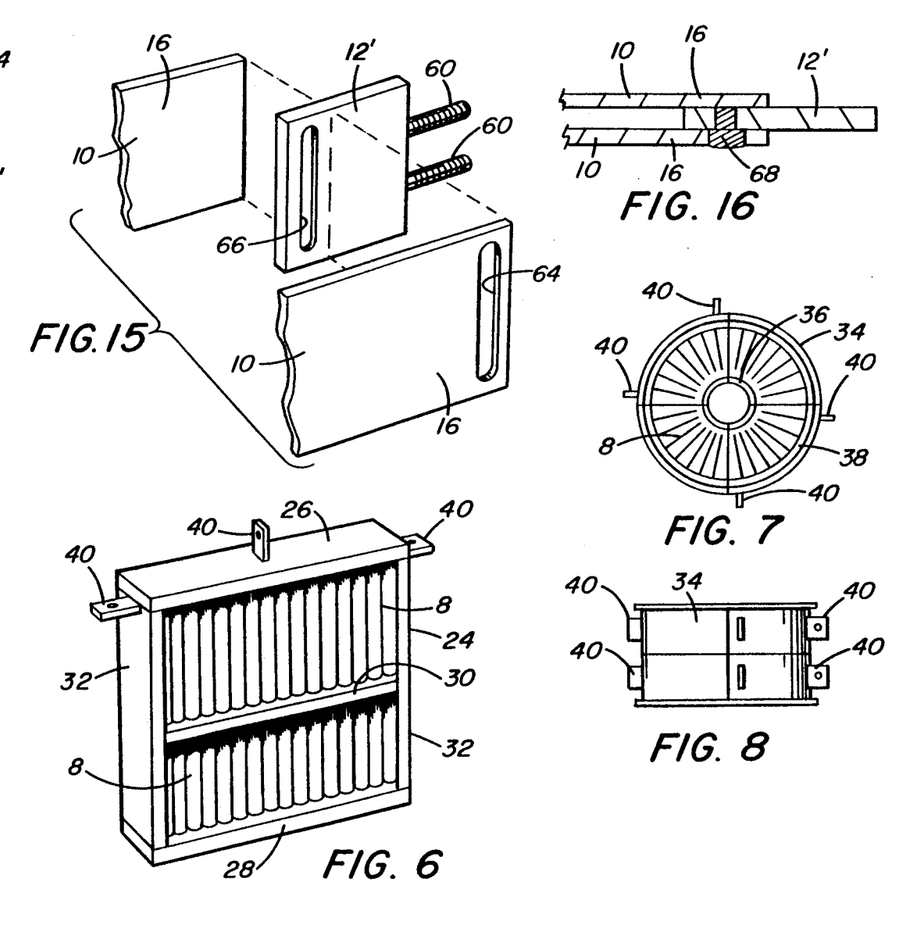
FIG. 6 is a perspective view of a fabricated resistor grid of the present invention in a rectangular frame.
FIG. 7 is a side elevation of the fabricated resistor grid of the present invention in an annular frame.
FIG. 8 is a top plan view of the resistor grid of FIG. 7.
FIG. 15 is an exploded sectional view showing modified resistor elements and a modified metal tab to facilitate welding.
FIG. 16 is a partial elevation showing the elements of FIG. 15 as welded.

The zigzag resistor 8 may be utilized in either a resistor grid having a rectangular frame as shown in FIG. 6 or in a resistor grid having an annular frame as shown in FIGS. 7 and 8. When utilized in a rectangular frame as shown in FIG. 6, the rectangular frame 24 has a top insulating member 26, a bottom insulating member 28, and an intermediate insulating member 30. Side frames 32 join the insulating members to each other.

When the zigzag resistor 8 is utilized in an annular frame as shown in FIGS. 7 and 8, the annular frame 34 has an inner insulating member 36 and an outer insulating member 38 which are oriented concentrically to each other with the zigzag resistor 8 in between. Insulating terminals 40 are provided in conventional fashion on either the annular resistor grid of FIGS. 7 and 8 or the rectangular resistor grid of FIG. 6.

As shown in FIG. 6, two zigzag resistors 8 are positioned within the rectangular frame. In the annular resistor of FIGS. 7 and 8, two zigzag resistors 8 are also positioned laterally to each other and axially spaced within the annular frame 34. It will be appreciated that zigzag resistors 8 can also be positioned laterally from each other within a rectangular frame to increase the resistive capability of the fabricated resistor grids.

FIGS. 9-14 illustrate various configurations for securing the zigzag resistor 8 between the insulating members of the respective frames of the resistor grids. It will be understood that the insulating members 42 and 44 can either be flat members utilized with a rectangular resistor grid or curved members utilized with an annular resistor grid. As shown in FIGS. 9-14, a first insulating member 42 is always located adjacent the closed ends 14 of the "U" shaped elements 10 and a second insulating member 44 is located adjacent the ends of the elements 10 that are joined by tabs 12.

Figures 9, 11:
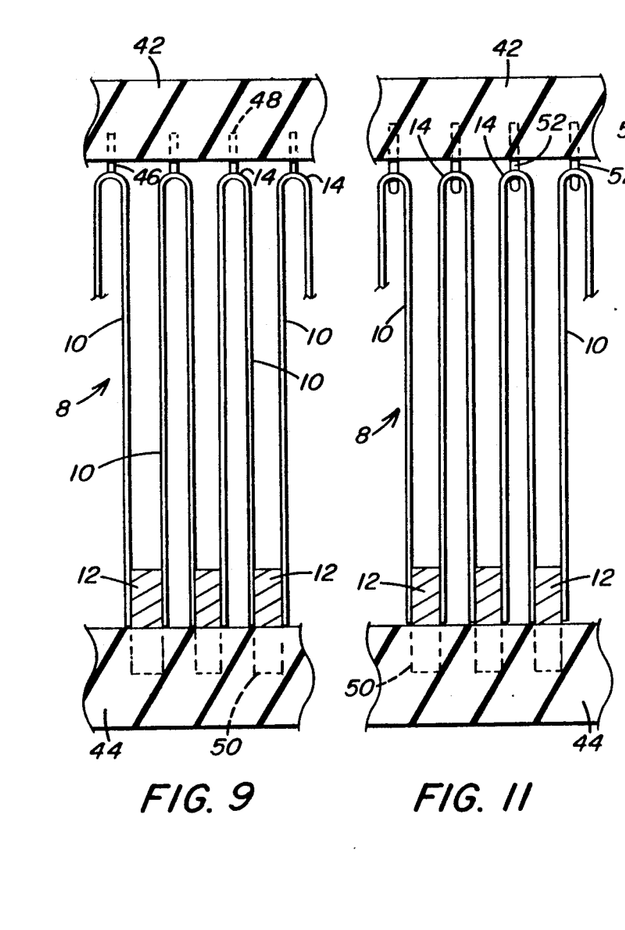
FIG. 9 is a side elevation of a portion of the resistor grid of the present invention.
FIG. 11 is a side elevation of another form of resistor grid of the present invention.
Figures 10, 12:
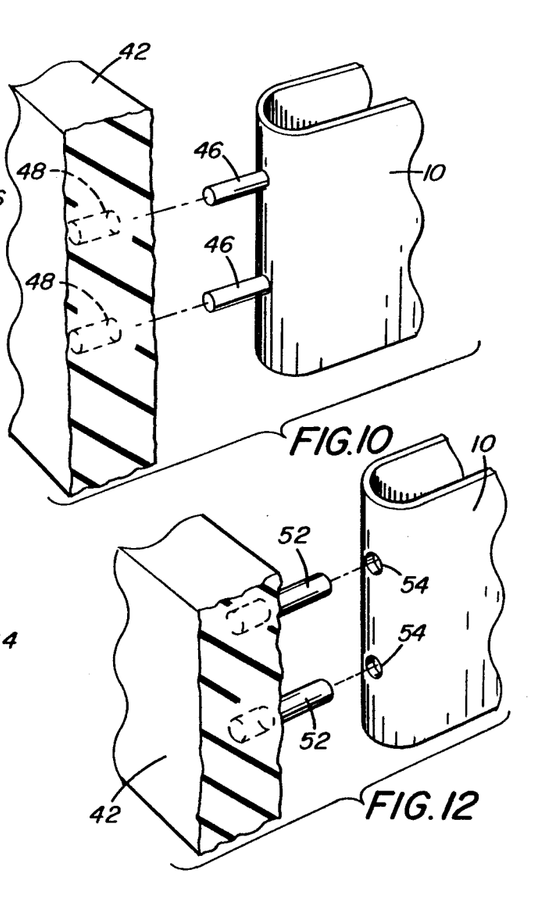
FIG. 10 is an exploded perspective view showing details of the resistor grid of FIG. 9.
FIG. 12 is an exploded perspective view showing details of FIG. 11.

As seen in FIGS. 9 and 10, metal studs 46 are welded to each of the "U" shaped elements 10 at the closed end of the element. These studs 46 are received in mating holes 48 that are formed in the first insulating member 42. The tabs 12 are received in slots 50 in the second insulating member 44. The zigzag resistor 8 is thereby retained between the insulating members 42 and 44.

As seen in FIGS. 11 and 12, a series of pins 52 are embedded in the first insulating member 42. The pins 52 are received in holes 54 formed in the "U" shaped elements 10. The tabs 12 joining adjacent "U" shaped elements 10 are received in slots 50 formed in second insulating member 44.

Figure 13:
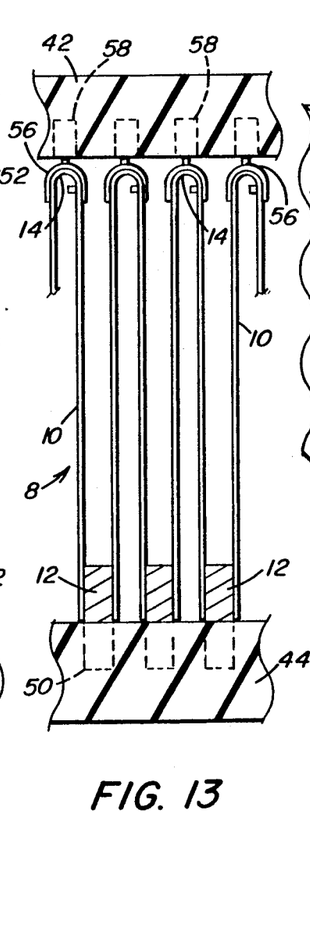
FIG. 13 is a side elevation of a portion of still another form of the resistor grid of the present invention.

As seen in FIG. 13, a series of clips 56 surround the closed ends 14 of "U" shaped elements 10 and are received within the first insulating member 42. These clips retain the zigzag resistor 8 whose tabs 12 are received within slots 50 of second insulating member 44.

Figure 14:
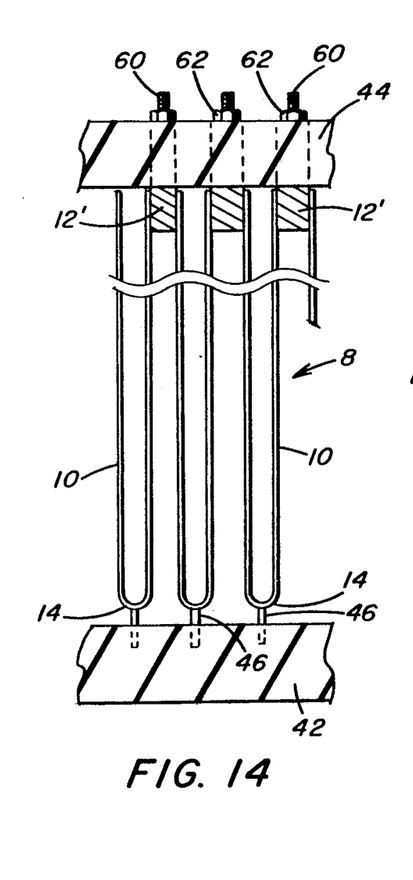
FIG. 14 is a side elevation of a portion of another form of the resistor grid of the present invention.

FIG. 14 shows the zigzag resistor 8 being suspended from the second insulating member 44 with fastener ends 60 that are formed on the tabs 12'. Details of the tabs 12' are shown in FIG. 15. The fastener ends 60 are threaded to receive nuts 62. The fastener ends 60 of tabs 12', extend all the way through second insulating member 44 and the nuts 62 are threaded onto the fastener ends 60 to suspend the zigzag resistor 8. At the closed ends 14, studs 46 are welded to the "U" shaped elements 10 and are received within holes in the first insulating member 42. It will be appreciated that if it is desired to suspend the zigzag resistor 8 from the closed ends 14 of the "U" shaped elements 10, the studs 46 can be elongated and threaded to receive nuts and can be extended all the way through first insulating member 42 with the nuts threaded on the studs.

In addition to showing the details of fastener ends 60 on tab 12', FIG. 15 shows an arrangement to facilitate welding of adjacent "U" shaped elements 10 and tab 12'. As shown in FIG. 15, one leg 16 of each "U" shaped element 10 has a slot 64 formed near the end of the leg 16. Tab 12' has a similar sized slot 66 formed in it. When the leg 16 with slot 64 is brought into contact with the tab 12' and the tab 12' is brought into contact with the unslotted leg 16 of an adjacent element 10, a plug weld 68 may securely join all three components as shown in FIG. 16.

Figure 17:
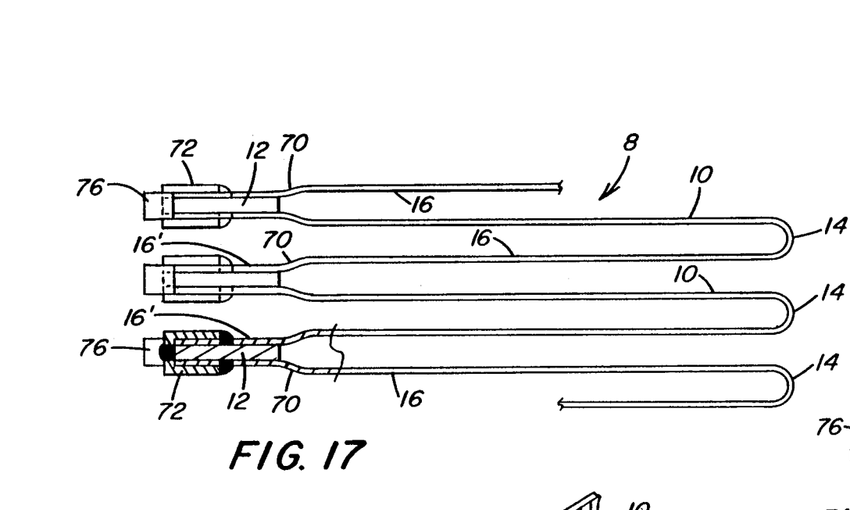
FIG. 17 is a side elevation of a portion of a zigzag resistor of the present invention having modified "U" shaped elements and clips to facilitate welding.
Figure 18:
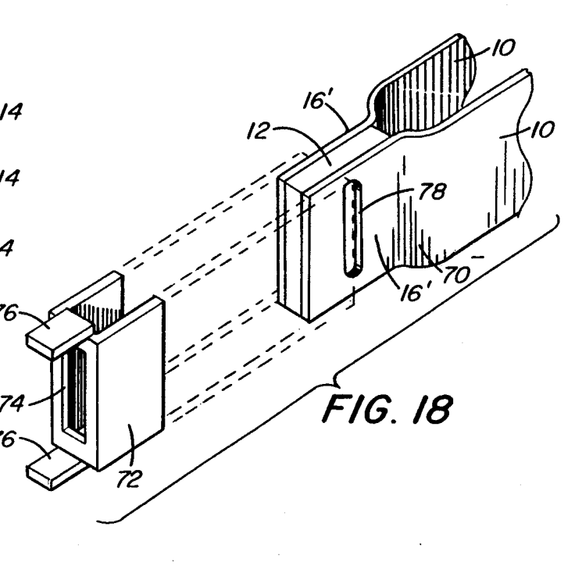
FIG. 18 is an exploded perspective view of the legs of two adjacent "U" shaped members of the zigzag resistor of FIG. 17 with a metal tab between them and a clip to be placed over the legs and the metal tab.

Referring now to FIGS. 17 and 18, there is shown a modified "U" shaped element 10 having a closed end 14 and legs 16. The "U" shaped element 10 of FIG. 17 has offsets 70 near the ends of legs 16 with a flattened portion 16' of leg 16 being parallel to the main portion of leg 16. As can be seen in FIG. 17, when the "U" shaped elements 10 are positioned generally parallel to each other with the closed ends 14 oriented in the same direction, the leg flat portions 16' are closer to each other than are the legs 16. In this fashion, a thinner tab 12 may be utilized or, if the same size tab 12 is utilized, the zigzag resistor 8 will have its elements 10 spaced further from each other.

FIG. 18 shows details of the method of using a clip 72 to facilitate welding of the "U" shaped elements 10 and tab 12 in the configuration shown in FIG. 17. Each leg portion 16' has a slot 78 formed in it. When the tab 12 is positioned between adjacent elements 10, the clip 72 is positioned over the ends of elements 10 so that the ends of clip 72 register with slots 78. Slot 74 formed in clip 72 then registers with the tab 12. The clip 72 is welded to tab 12 through slot 74 and the ends of clip 72 are welded to adjacent elements 10 and tab 12 through slots 78.

Figure 19:
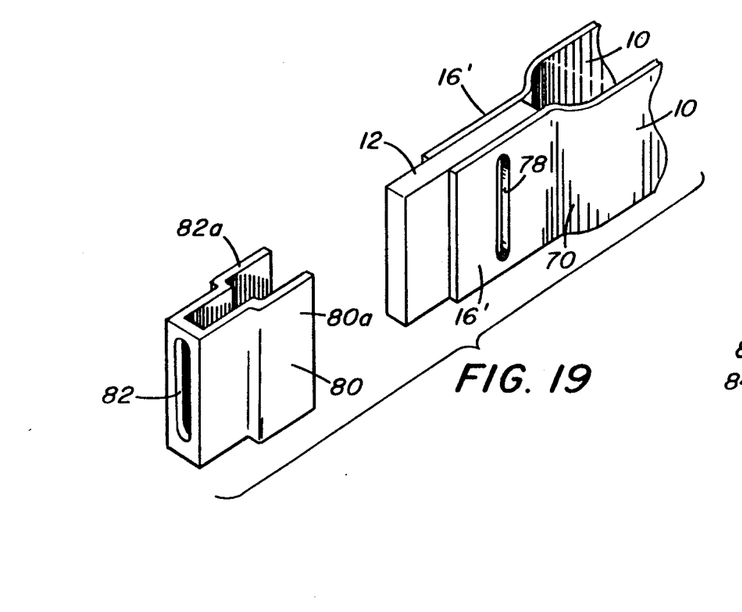
FIG. 19 is an exploded perspective view similar to FIG. 18 showing another form of clip.
Figure 20:
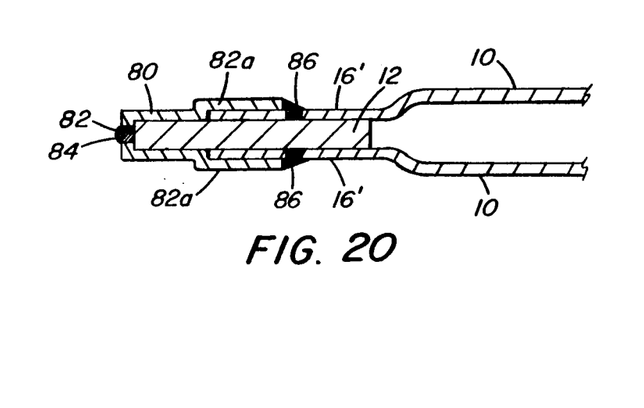
FIG. 20 is a partial elevation showing the elements of FIG. 19 as welded together.

FIGS. 19 and 20 show a modification of the welding arrangement shown in FIGS. 17 and 18. In FIGS. 19 and 20, a clip 80 has a slot 82 which registers with the tab 12. The clip 80 also has offset legs 80a so that the body of the clip 80 comes into close contact with a portion of tab 12 which extends beyond leg portion 16' of the "U" shaped elements 10 and the legs 80a contact the leg portions 16'. The slot 78 in each portion 16' registers with the tab 12 and with the end of clip 80. As shown in FIG. 20, weld 84 joins tab 12 to clip 80 through slot 82 and welds 86 join the ends of clip 80 to leg portions 16' and tab 12 through slots 78.

Figure 21:
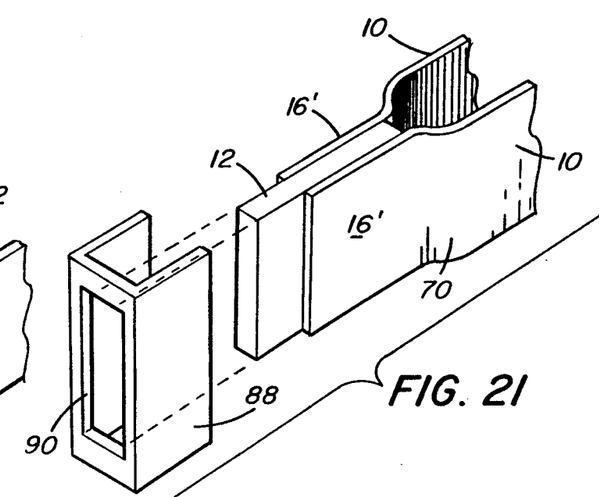
FIG. 21 is an exploded perspective view similar to FIGS. 18 and 19 showing another form of clip.
Figure 22:
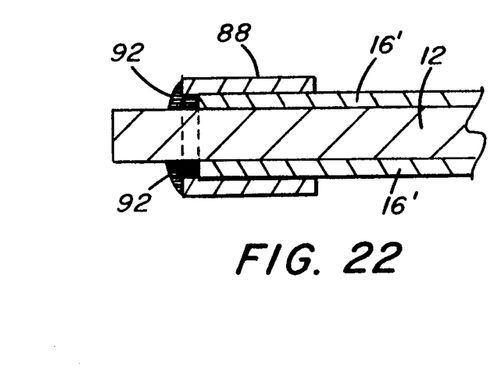
FIG. 22 is a view similar to FIG. 20 showing the components of FIG. 21 as welded.
Figure 23:
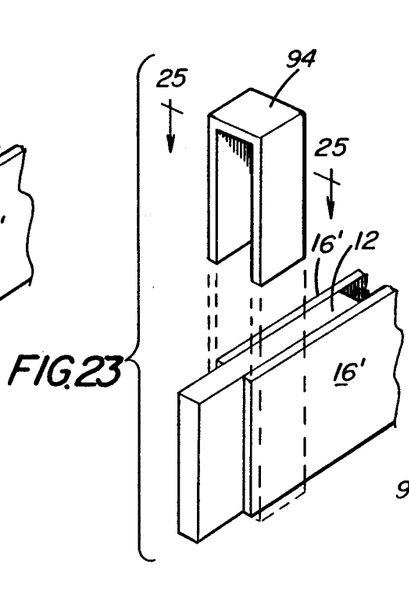
FIG. 23 is an exploded perspective view showing another form of clip.
Figure 24:
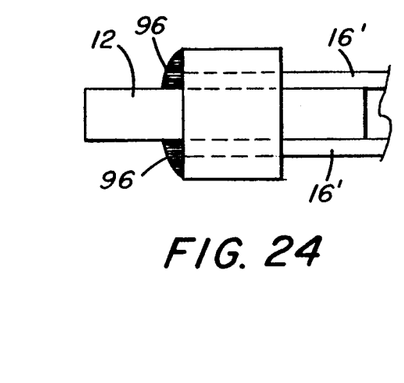
FIG. 24 is a view showing the components of FIG. 23 as welded.
Figure 25:
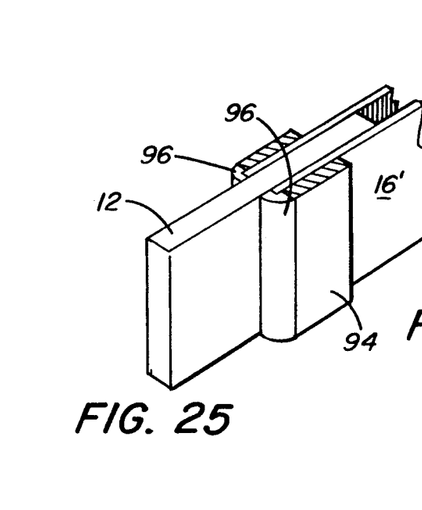
FIG. 25 is a partial section along line 25—25 of FIG. 23 showing the position of the clip and the welds of the device of FIG. 23.
Figure 26:
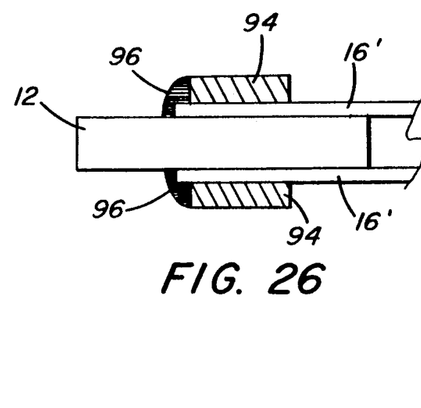
FIG. 26 is an elevation showing the clip and weld as depicted in FIG. 25.

FIGS. 21 and 22 illustrate another form of clip 88 which has a slot 90 formed therein. The clip 88 and slot 90 are sufficiently large that slot 90 surrounds the end of tab 12 which extends beyond the leg portion 16' of "U" shaped elements 10. As shown in FIG. 22, after the clip 88 is positioned over the tab 12, welds 92 join the clip, the leg portions 16', and the tab 12 to each other.

FIGS. 23 through 26 illustrate still another form of clip utilized to weld leg portions 16' of "U" shaped elements 10 to the tabs 12. A clip 94 simply bridges the three elements with the sides of clip 94 being substantially aligned with the ends of leg portions 16'. Welds 96 then join the clip 94, the leg portion 16' and the tab 12.

Figure 27:
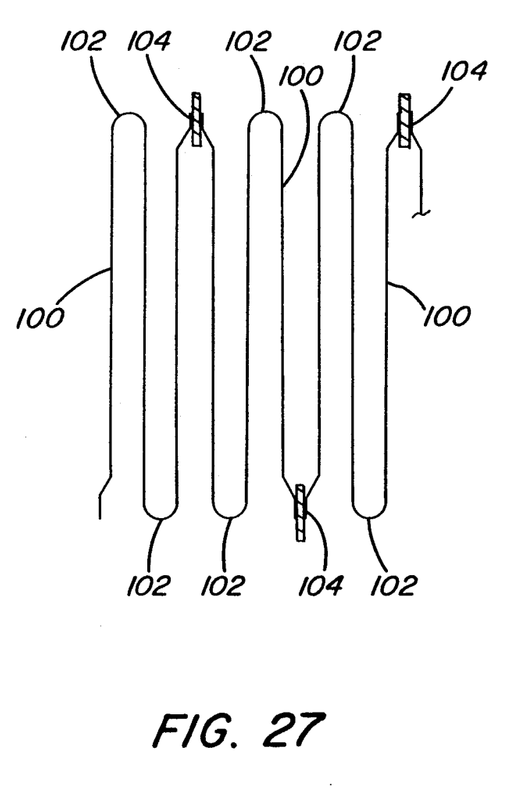
FIG. 27 is a side elevation of a portion of the zigzag resistor of the present invention with each resistor element having two "U" bends.
Figure 28:
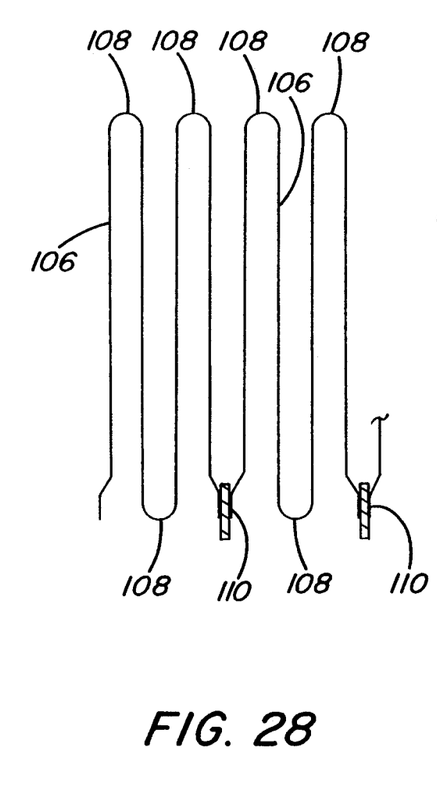
FIG. 28 is a side elevation of a portion of a zigzag resistor with each resistor element having three "U" bends.
Figure 29:
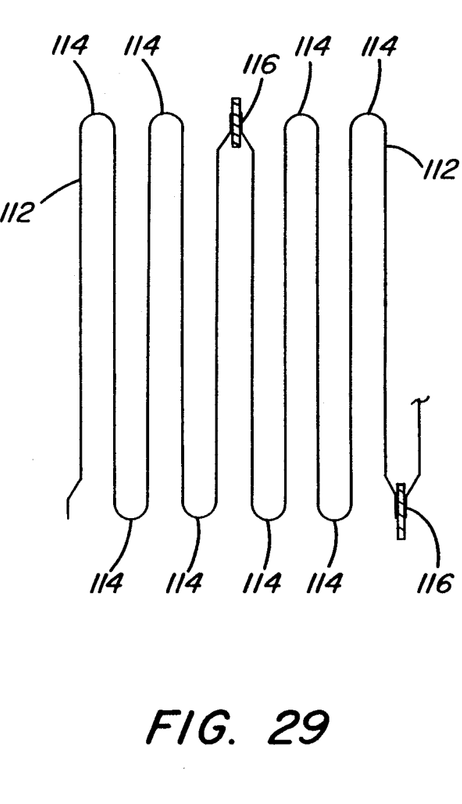
FIG. 29 is a side elevation of a portion of a zigzag resistor with each resistor element having four "U" bends.

Referring now to FIGS. 27, 28 and 29, portions of zigzag resistors are shown similar to FIG. 1. In FIG. 27, resistor elements 100 have "U" bends 102 formed in them. The resistor elements 100 are joined to each other by welded joints 104. In FIG. 27, each resistor element 100 contains two "U" bends 102.

In FIG. 28, resistor elements 106 contained "U" bends 108 and are joined together by welded joints 110. In FIG. 28, each resistor element 106 contains three "U" bends 108. FIG. 29, having resistor elements 112 with "U" bends 114 and welded joints 116, shows resistor elements having four "U" bends 114 each.

In the resistor elements of FIG. 1, there is only one "U" bend in each element. In resistors of the type shown in FIGS. 27, 28 and 29, where additional "U" bends in each resistor element are provided, the manufacturing process is substantially simpler than the use of a continuous fan-folded ribbon resistor without welded joints and the heat dissipation characteristics of the zigzag resistors having multiple "U" bends in each resistor element is somewhat superior to the heat dissipation characteristics of the zigzag resistor of the type shown in FIG. 1 where each resistor element contains only one "U" bend.

When continuous fan-folded resistor elements are manufactured, it is necessary to continuously adjust the apparatus producing the fan-folded metal for the resistor in order to form a uniform fan-fold that prevents the resistor from losing its shape and possibly shorting out when subjected to extreme heat. By utilizing multiple "U" bend resistor elements as shown in FIGS. 27, 28 and 29, the constant adjustment of the bending apparatus is eliminated since the resistor elements are still relatively short. The number of welded joints is reduced substantially as compared with resistor elements having only one "U" bend which facilitates manufacture and also provides more uniform dissipation of heat. The welded joints 104 of FIG. 27, 110 of FIG. 28, and 116 of FIG. 29 are preferably formed as illustrated and described in connection with FIGS. 23 through 26, inclusive.

Figure 30:
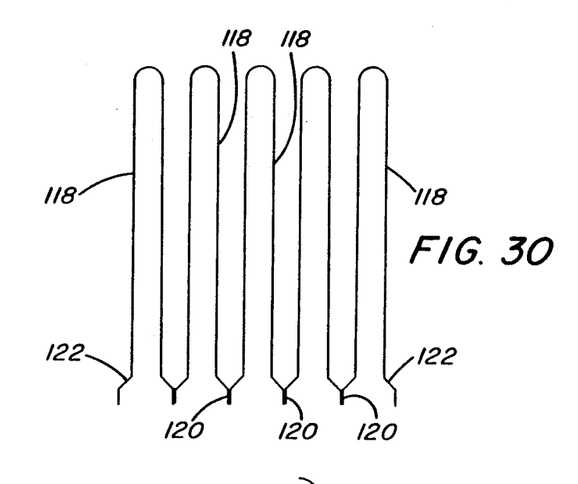
FIG. 30 is a side elevation of a portion of a zigzag resistor having "U" shaped elements that are welded directly to each other without tabs.
Figure 32:
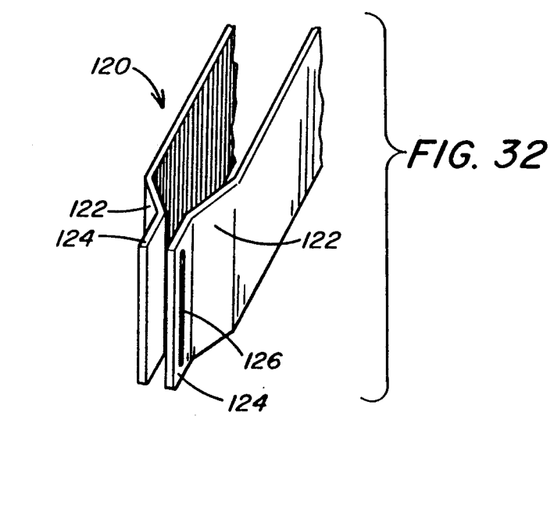
FIG. 32 is an exploded prospective view of the legs of two adjacent "U" shaped members of FIG. 30.

FIG. 30 illustrates a portion of a zigzag resistor having resistor elements 118 that each have a single "U" bend. The resistor elements 118 are joined by welded joints 120 as shown in greater detail in FIG. 32. Each resistor element 118 has an offset portion 122 that terminates in a flat portion 124 that is parallel to the leg of the resistor element. A slot 126 is formed in one leg of each resistor element 118. The legs of adjacent resistor elements 118 are then welded directly to each other with a plug weld being formed through the slot 126 of one leg against the leg of the adjacent element 118 which has no slot. No tab is utilized in this welded joint 120.

Figure 31:
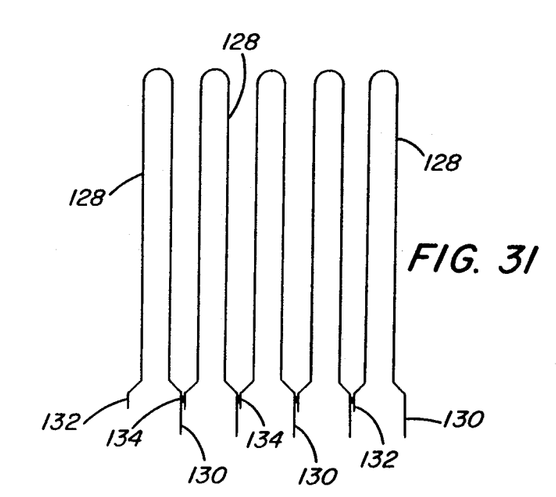
FIG. 31 is a side elevation of a portion of a zigzag resistor with the "U" shaped elements welded directly to each other and with one leg of the "U" shaped element longer than the other.
Figure 33:
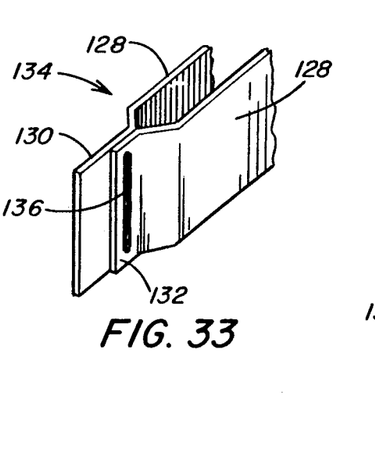
FIG. 33 is a prospective view of a welded joint of the resistor of FIG. 31.
Figure 34:
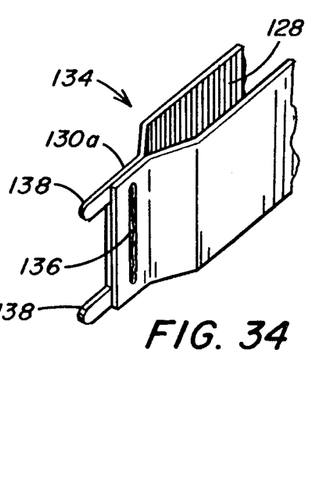
FIG. 34 is a view similar to FIG. 33 showing a different form of welded joint of the resistor of FIG. 31.

FIG. 31 illustrates a zigzag resistor having resistor elements 128. Each resistor element has a long leg 130 and a short leg 132. The welded joints 134 join the resistor elements. FIGS. 33 and 34 show variations of the welded joints of the zigzag resistor of FIG. 31. In FIG. 33, the long leg 130 extends beyond the short leg 132 of an adjacent resistor element 128. A slot 136 is formed in the short leg 132 and a plug weld through slot 136 joins the legs of adjacent resistor elements.

In FIG. 34, the parts are the same as those of FIG. 33 except that the long leg 130a is cut away to form prongs 138 on long leg 130a. The resistor elements 128 are welded together in the same fashion through a slot 136.

FIGS. 35, 36, 37, 38, and 39 each illustrate welded joints which are generally similar to the welded joint shown and described in connection with FIGS. 23 through 26, inclusive. The welded joints of FIGS. 35 through 39, inclusive, differ only in the forms of the tabs to which the legs of adjacent resistor elements are welded.

Figure 35:
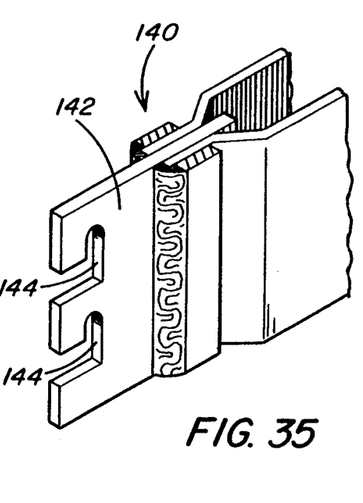
FIG. 35 is a prospective view of a welded joint similar to that shown in FIGS. 24 through 26, inclusive.

As seen in FIG. 35, the welded joint 140 has a tab 142 that has two hook-like indentations 44 formed in the tab to more readily connect the welded joint 140 to an insulating member.

Figure 36:
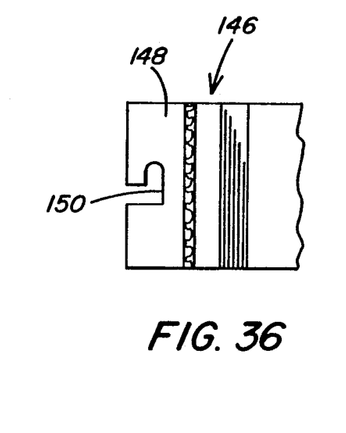
FIG. 36 is a welded joint similar to FIG. 35 showing a different form of locking mechanism.
Figure 37:
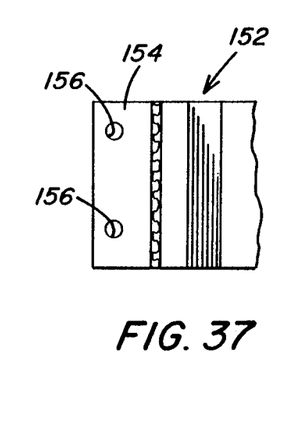
FIG. 37 is a welded joint similar to FIGS. 35 and 36 showing still another form of locking mechanism.
Figure 38:
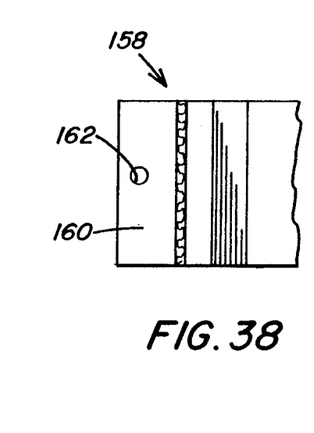
FIG. 38 is a welded joint similar to FIG. 37 showing another form of locking mechanism.
Figure 39:
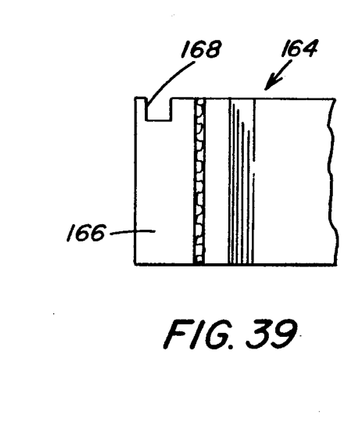
FIG. 39 is a welded joint similar to FIG. 35 showing another form of locking mechanism.

The welded joint 146 of FIG. 36 has a tab 148 with a single hook-like indentation 150 formed therein. FIG. 37 shows welded joint 152 with tab 154 that has two holes 156 passing through the tab 154. FIG. 38 shows welded joint 158 with tab 160 having a single hole 162 formed through the tab. Welded joint 164 of FIG. 39 has a tab 166 with an indentation 168 formed in one side of the tab.

Figures 40, 41:
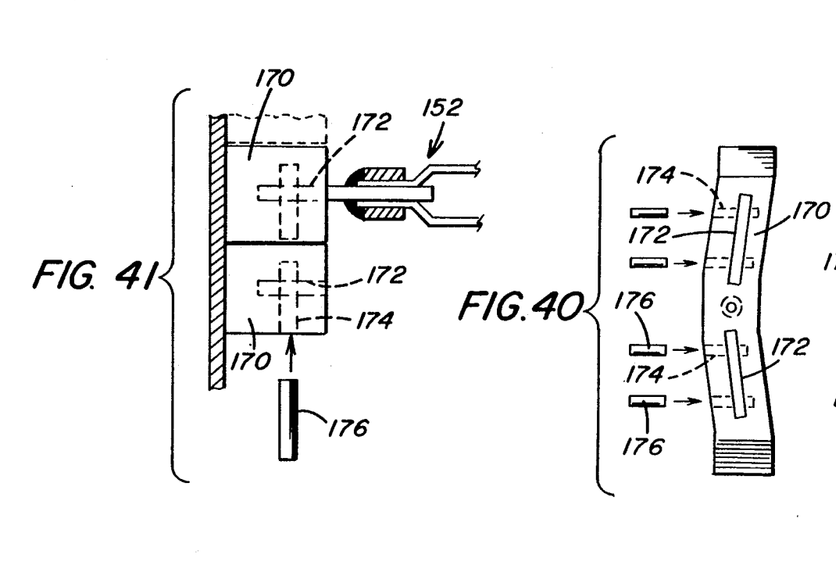
FIG. 40 is an exploded view of an insulating member element of the present invention.
FIG. 41 is a partial top view of an insulating member element receiving a welded joint of the type shown in FIG. 38.
Figure 40A:
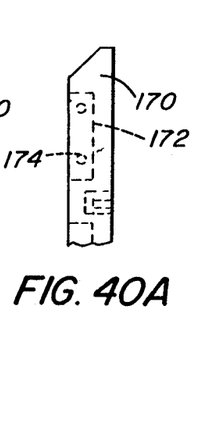
FIG. 40A is a partial side elevation of the element of FIG. 40.

FIGS. 40, 40A, and 41 show details of an insulating member element 170 that has slots 172 formed with transverse holes 174 that intersect the slots. Pins 176 are inserted into the holes 174 so that the pins intersect the slots 172. With the insulating member element 172 having two pins 176 transverse to slots 172, a welded joint such as 140 or a welded joint such as 156 can be accommodated. With welded joint 140, the pins may be positioned before the joint 140 has its tab 142 inserted into the slot 172. The joint 140 permits the hook-like indentations 144 to be inserted over the pins and the welded joint 140 is then moved downwardly as viewed in FIG. 35 so that the pins are located in the upper portion of indentations 144 to prevent withdrawal of the welded joint.

If welded joint 152 of FIG. 37 is utilized with the insulating member element 170, as shown in FIG. 41, the tab 154 is first inserted into the slot 172 and the pins 176 are thereafter positioned through the side of the insulating member element 170 through holes 174 and through the holes 156 in tab 154. Although not shown, it should be appreciated that configurations of insulator member element 170 with appropriate pin positions can be arranged to accommodate welded joints 146 of FIG. 36, 158 of FIG. 38 and 164 of FIG. 39. Welded joint 164 of FIG. 39 would have a pin permanently positioned and would be moved into the slot and upwardly as viewed in FIG. 39 to have the pin positioned into the indentation 168.

Figure 42:
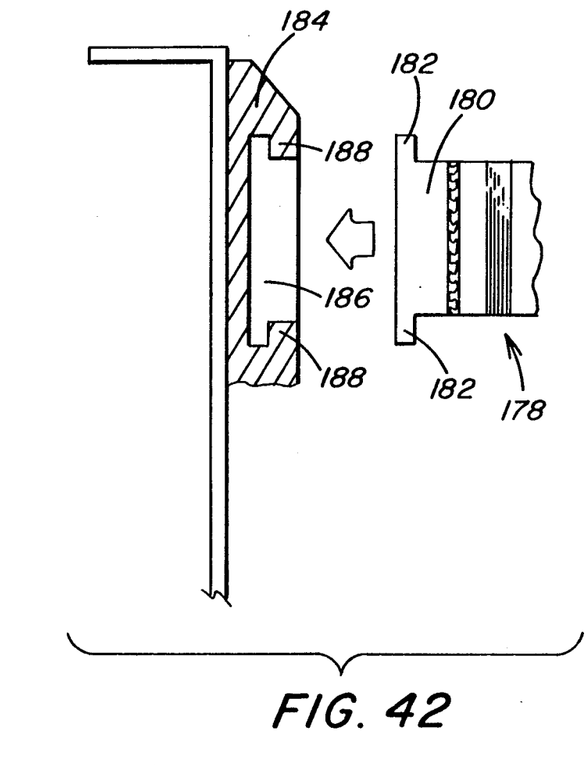
FIG. 42 is an exploded view of an insulating member element and a welded joint positioned to be inserted into the insulating member element.
Figure 43:
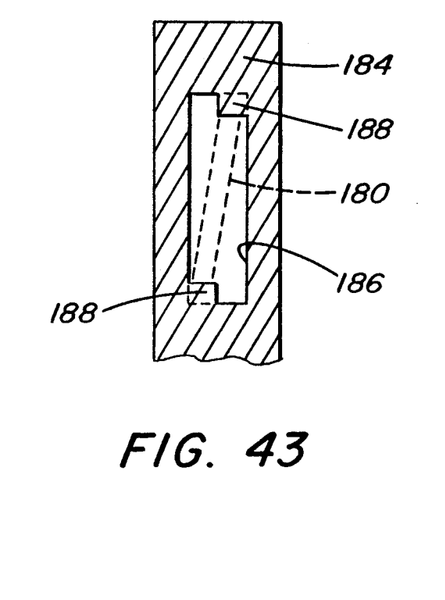
FIG. 43 is a front sectional view of the insulating member element of FIG. 42 showing the welded joint locked in position.

FIGS. 42 and 43 illustrate another form of welded joint 178 which is also similar to that shown and described in connection with FIGS. 23 through 26, inclusive. The welded joint 178 has a tab 180 which has lugs 182 projecting outwardly from the tab 180. The insulating member element 184 has an oversized slot 186 formed in it. The oversize slot 186 has shoulders 188 formed at diagonally opposite ends of the front of the slot 186. The tab 180 is inserted in the slot 186 by turning it to clear the shoulders 188. The tab 180 is then turned to the position shown in FIG. 43 so that the lugs 182 pass behind shoulders 188 and prevent the tab 180 from being withdrawn from the slot.

FIGS. 44, 45, 46, 47, and 48 all show configurations of insulating member elements connected to the metal frame 190 of the fabricated resistor grid. The respective insulating member elements are formed in short sections and connected individually to the metal frame 190. This is particularly true in the annular configuration of the resistor grid shown in FIGS. 7 and 8.

Figure 44:
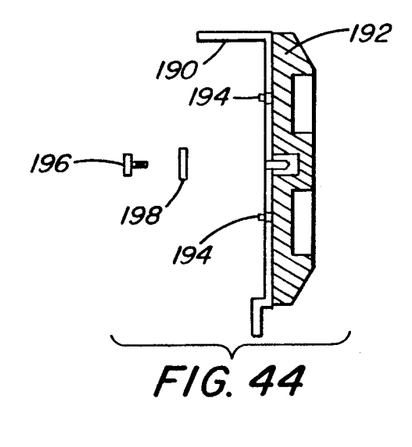
FIG. 44 is a partial sectional view of an insulating member element secured to a metal frame by bosses and a bolt.

As seen in FIG. 44, the insulating member element 192 has a pair of locating bosses 194 that protrude through locating holes in the metal frame 190. A bolt 196 passes through a washer 198 and a hole in the frame 190 and is threaded into the element 192 to hold the insulating member element 192 onto the metal frame 190.

Figure 45:
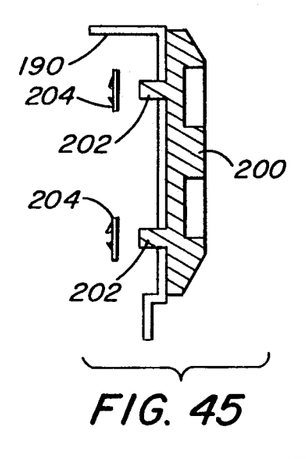
FIG. 45 is a sectional view of an insulating member element secured to a metal frame by bosses and push-on grip nuts.

In FIG. 45, the insulating member element 200 has enlarged bosses 202 formed on the rear face which protrude through holes in the metal frame 190. Push-on grip nuts 204 are placed upon bosses 202 to retain the element 200 in place on metal frame 190.

Figure 46:
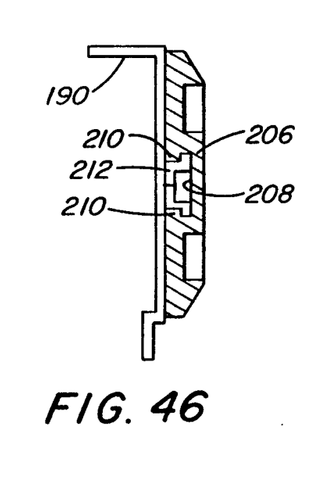
FIG. 46 is a sectional view of an insulating member element secured to a metal frame by a channel and groove arrangement.

In FIG. 46, the insulating member element 206 has a groove 208 formed in the rear face with shoulders 210 reducing the size of the groove at the rear face of the element 206. A metal channel 212 is fixed to metal frame 190 and outwardly extending portions of the channel 212 enter the groove 208 when the insulating member element 206 is slid along the channel 212 from the end of the channel and the protruding portions of channel 212 prevent the insulating member element 206 from being removed from metal frame 190.

Figure 47:
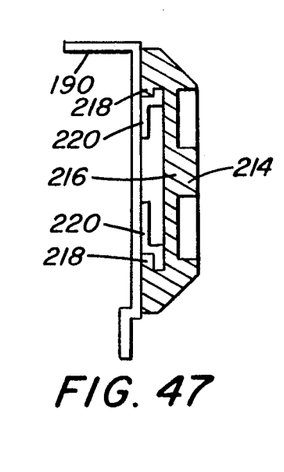
FIG. 47 is an insulating member element secured to a metal frame by an enlarged channel and groove arrangement.

The arrangement shown in FIG. 47 is generally similar to that of FIG. 46 in that the insulating member element 214 has an enlarged groove 216 formed at the rear face with shoulders 218 reducing the size of the groove at the face. Two separate channel members 220 are fixed to metal frame 190 and when the element 214 is slid over the channel members 220, the channel members 220 cooperate with the shoulders 218 to prevent removal of the element 214 from the metal frame 190.

Figure 48:
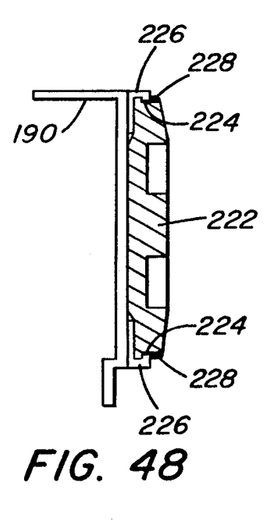
FIG. 48 is a sectional view of an insulating member element secured to a metal frame by grooves in the edges of the element.

In FIG. 48, the insulating member element 222 has grooves 224 formed in each edge. Channel members 226 are fixed to metal frame 190 and have sidewalls 228 which extend into the grooves 224 when the element 222 is s)id longitudinally on to the channels 226.

It will be appreciated that any one of the arrangements shown in FIGS. 44 through 48, inclusive, can be utilized to attach elements of the insulating members to the metal frames that form the resistor grids of the present invention. The insulating member elements 192, 200, 206, 214, and 222 can receive either welded joints or pins to fix the "U" bends of the present invention to the insulating members. It should be understood that any of the various welded joints depicted and described in this specification can be accommodated by insulating members that are fixed to the metal frame of the resistor grid as shown in FIGS. 45 through 48, inclusive.

Figure 49:
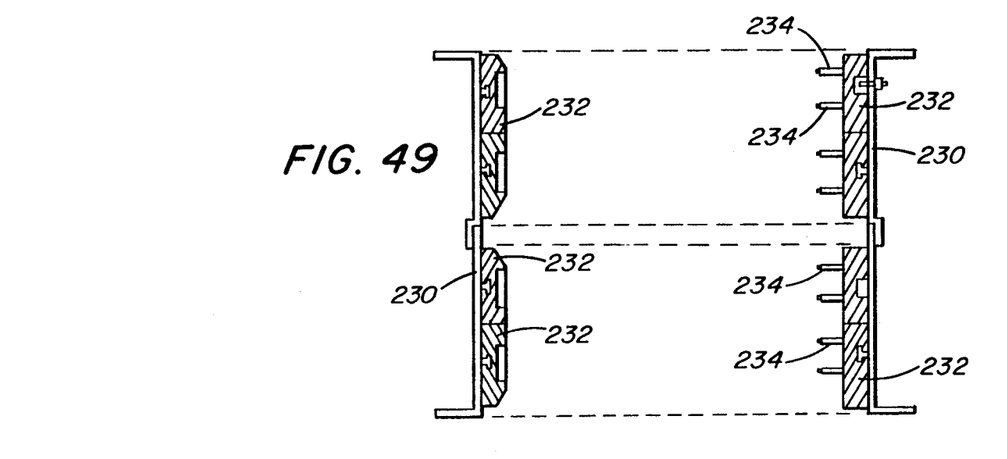
FIG. 49 is a sectional view of a metal frame and insulating member elements arranged to hold multiple zigzag resistors.

FIG. 49 illustrates a metal frame 230 having multiple insulating member elements 232 some of which have pins 234 embedded in them so that they can receive the "U" bend portions of the resistor elements as shown in FIG. 12. As may be seen in FIG. 49, four separate zigzag resistors can be accommodated one above the other in the frame 230.

Figure 50:
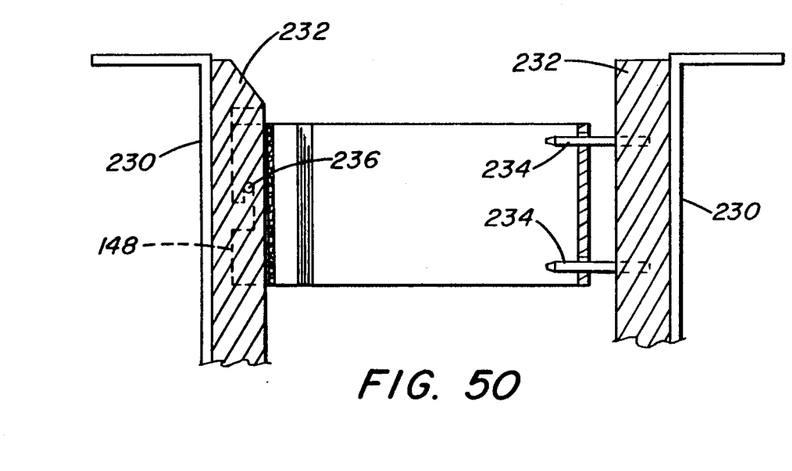
FIG. 50 is a partial sectional view illustrating the thermal expansion ability of the resistor element when supported between insulating member elements.

In FIG. 50, the top portion of the metal frame 230 is shown as it might receive a zigzag resistor having a welded joint such as shown in FIG. 36 with a tab 148 held in place by a pin 236 that passes transversely through a slot in the insulating member element 232. The "U" bend portion of the resistor element is supported on pins 234 embedded in the insulating member element 232 in a fashion similar to that shown in FIG. 12. With the arrangement shown in FIG. 50, thermal expansion of the resistor element in a longitudinal direction is permitted since it slides over pins 234.

Figure 51:
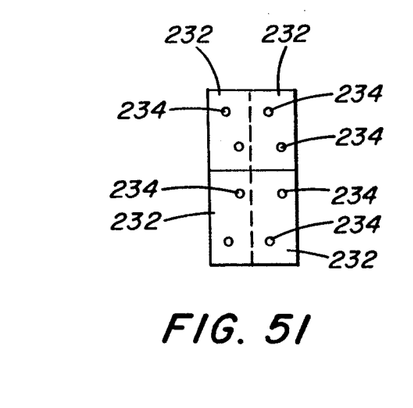
FIG. 51 is a schematic representation of the arrangement of multiple insulating member elements.

FIG. 51 is a schematic illustration showing the arrangement of the pins 234 in insulating member elements 232 in a resistor grid having two individual zigzag resistors. As shown in FIG. 40 and in FIG. 51, the slots 172 of FIG. 40 and the pins 234 of FIG. 51 are offset so that the individual zigzag resistors are not precisely parallel to each other but rather are canted to each other. By canting the zigzag resistors, turbulence is enhanced as air is forced through the resistors to increase the heat transfer capacity of the resistors.

It should be understood that the various configurations of zigzag resistor elements, insulating member elements, welded joints and attachment arrangements for attaching the insulating member elements to the metal frame can all be used in various combinations with each other in practicing this invention. It should also be understood that the legs of the various resistor elements may be embossed or not embossed for stiffening purposes depending upon the size of the resistor elements and the materials from which they are made.

According to the provisions of the patent statutes, we have explained the principle, preferred construction and mode of operation of our invention and have illustrated and described what we now consider to represent its best embodiments. However, it should be understood, that within the scope of the appended claims, the invention may be practiced otherwise than as specifically illustrated and described.

We claim:

1. A fabricated resistor grid including a frame having space apart first and second insulating members supporting a zigzag resistor, said zigzag resistor comprising:

a plurality of resistor elements formed of sheet metal having at least one "U" shaped bend and not more than four "U" shaped bends in each element, said resistor elements being connected by welded joints to each other to form said zigzag resistor, a first type of connecting means connecting said "U" shaped bends to said first and second insulating members, a second type of connecting means connecting said welded joints of said zigzag resistor to said first and second insulating members whereby said continuous zigzag resistor is supported between said first and second insulating members.

2. A fabricated resistor grid including a frame having spaced apart first and second insulating members supporting a zigzag resistor, said zigzag resistor comprising:

a plurality of elongated "U" shaped elements having a single "U" shaped bend in each element formed of sheet metal oriented with the closed end of the "U" of each element adjacent said first insulating member and the open end of the "U" of each element adjacent said second insulating member, connecting means connecting said closed end of each of said "U" shaped elements to said first insulating member, a plurality of metal tabs having a thickness greater than the thickness of the sheet metal forming said "U" shaped elements welded between adjacent "U" shaped elements, the tab ends of said "U" shaped elements being connected to said second insulating member, said metal tabs each electrically connecting two adjacent "U" shaped elements to each other whereby a continuous zigzag resistor is formed.

3. The fabricated resistor grid of claim 2 wherein said frame is a rectangular frame.

4. The fabricated resistor grid of claim 2 wherein said frame is an annular frame.

5. The fabricated resistor grid of claim 2 wherein one leg of each "U" shaped element and said tabs each have a slot formed therein whereby a plug weld extending through said slots joins said leg having a slot therein and said tab to an unslotted leg of an adjacent "U" shaped element.

6. The fabricated resistor grid of claim 2 wherein a metal clip is placed over adjacent legs of two "U" shaped elements with said tab therebetween and said clip is welded to said legs and said tab to join adjacent "U" shaped elements.

7. The fabricated resistor grid of claim 6 wherein said clip has a slot through which said tab protrudes and the legs of said clip overlay said adjacent legs of said two "U" shaped elements.

8. The fabricated resistor grid of claim 6 wherein each of said legs of adjacent "U" shaped elements have slots formed therein, said clip has a slot therein to register with said tab and the legs of said clip extend to said "U" shaped element leg slots whereby said clip is welded to said tab through said clip slot and said clip legs are welded to said "U" shaped element legs and said tab by plug welds through said "U" shaped element leg slots that contact said tab and the ends of said clip legs.

9. The fabricated resistor grid of claim 8 wherein said clip legs are contoured to closely receive a tab which extends beyond the ends of said "U" shaped resistor element legs.

10. The fabricated resistor grid of claim 2 wherein said connecting means includes metal studs welded to said "U" shaped elements and received within said first insulating member.

11. The fabricated resistor grid of claim 2 wherein said connecting means includes metal pins fixed within said first insulating member and received within holes formed in said "U" shaped elements.

12. The fabricated resistor grid of claim 2 wherein said connecting means includes metal clips received within said first insulating member and surrounding the rounded closed end portion of said "U" shaped elements.

13. The fabricated resistor grid of claim 3 wherein at least two zigzag resistors are supported between said first and second insulating members and are spaced laterally from each other.

14. The fabricated resistor grid of claim 4 wherein at least two zigzag resistors are supported between said first and second insulating members and are spaced laterally from each other.

15. The fabricated resistor grid of claim 2 wherein said tabs have fastener portions extending through said second insulating member with fasteners affixed to said fastener portions so that said "U" shaped elements may be suspended from said second insulating member.

16. The fabricated resistor grid of claim 2 wherein both flat portions of each "U" shaped element are embossed to stiffen said flat portions.

17. The fabricated resistor grid of claim 2 wherein said "U" shaped elements have metal studs welded to the closed end of said "U" shaped elements and said metal studs extend through said first insulating member whereby fastener means are affixed to said metal studs so that said "U" shaped elements may be suspended from said first insulating member.

18. The fabricated resistor grid of claim 2 wherein the legs of each "U" shaped element have offset portions formed near the open ends of said "U" shaped elements so that when said "U" shaped elements are positioned substantially parallel to each other, the ends of the legs of adjacent "U" shaped elements are closer to each other than the full leg portions of said "U" shaped elements.

19. A fabricated resistor grid including a frame having space apart first and second insulating members supporting a zigzag resistor, said zigzag resistor comprising:
   a plurality of elongated "U" shaped elements having a single "U" shaped bend in each element formed of sheet metal oriented with the closed end of the "U" of each element adjacent said first insulating member and the open end of the "U" of each element adjacent said second insulating member, the flat portions of each "U" shaped element being embossed to stiffen said flat portions,
   connecting means connecting said closed end of each of said "U" shaped elements to said first insulating member,
   a plurality of metal tabs having a thickness greater than the thickness of the sheet metal forming said "U" shaped elements welded between adjacent "U" shaped elements, said metal tabs each electrically connecting two adjacent "U" shaped elements to each other whereby a continuous zigzag resistor is formed,
   metal clips welded to adjacent legs of "U" shaped elements with said tabs therebetween to facilitate welding of said tabs and said "U" shaped elements, and
   means to secure the tab ends of said "U" shaped elements to said second insulating member.

20. The fabricated resistor grid of claim 19 wherein the legs of each "U" shaped element have offset portions formed near the open ends of said "U" shaped elements so that when said "U" shaped elements are positioned parallel to each other, the ends of the legs of said "U" shaped elements are closer to each other than the full leg portions of said "U" shaped elements.

21. A zigzag electrical resistor comprising:
   a plurality of elongated "U" shaped elements having a single "U" shaped bend in each element formed of sheet metal positioned substantially parallel to each other so that the closed ends of said "U" shaped elements are oriented in the same direction,
   a plurality of metal tabs having a thickness greater than the thickness of the sheet metal forming said "U" shaped elements welded between legs of adjacent "U" shaped elements at the open end of said "U" shaped elements,
   said "U" shaped elements and said welded tabs forming a continuous zigzag electrical resistor.

22. The zigzag electrical resistor of claim 21 wherein both flat portions of each "U" shaped element are embossed to stiffen said flat portions.

23. The zigzag electrical resistor of claim 21 wherein the legs of each "U" shaped element have offset portions formed near the open ends of said "U" shaped elements so that when said "U" shaped elements are positioned substantially parallel to each other, the ends of the legs of adjacent "U" shaped elements are closer to each other than the full leg portions of said "U" shaped elements.

24. A fabricated resistor grid comprising a metal frame, first and second insulating members spaced apart from each other and secured to said metal frame by securing means that secure elements of said first and second insulating members to said metal frame,
   a zigzag resistor grid supported between said first and second insulating members, said resistor grid being formed from a plurality of resistor elements formed of sheet metal having at least one "U" shaped bend and not more than four "U" shaped bends in each element,
   said resistor elements being connected by welded joints to each other to form said zigzag resistor,
   a first type of connecting means connecting said "U" shaped bends to said insulating members, a second type of connecting means connecting said welded joints of said resistor to said insulating members, said first type of connecting means and said second type of connecting means together permitting some movement of said zigzag resistor relative to said insulating members to accommodate thermal expansion of said zigzag resistor.

25. The fabricated resistor grid of claim 24 wherein each resistor element contains at least two "U" shaped bends.

26. The fabricated resistor grid of claim 24 wherein each resistor element contains at least three "U" shaped bends.

27. The fabricated resistor grid of claim 24 wherein said frame is a rectangular frame.

28. The fabricated resistor grid of claim 24 wherein said frame is an annular frame.

29. The fabricated resistor grid of claim 24 wherein each welded joint is formed with one leg of each resistor element and with a tab that each have a slot formed therein whereby a plug weld extending through said slots joins said leg having a slot therein and said tab to an unslotted leg of an adjacent resistor element.

30. The fabricated resistor grid of claim 24 wherein each welded joint is formed with a metal clip being placed over adjacent legs of two resistor elements with a tab therebetween and said clip is welded to said legs and said tab to join adjacent resistor elements.

31. The fabricated resistor grid of claim 30 wherein said clip has a slot through which said tab protrudes and the legs of said clip overlay said adjacent legs of said two resistor elements.

32. The fabricated resistor grid of claim 30 wherein each of said legs of adjacent resistor elements have slots formed therein, said clip has a slot therein to register with said tab and the legs of said clip extend to said resistor element leg slots whereby said clip is welded to said tab through said clip slot and said clip legs are welded to said resistor element legs and said tab by plug welds through said resistor element leg slots that contact said tab and the ends of said clip legs.

33. The fabricated resistor grid of claim 32 wherein said clip legs are contoured to closely receive a tab which extends beyond the ends of said resistor element legs.

34. The fabricated resistor grid of claim 24 wherein said first type of connecting means includes metal studs welded to said "U" shaped bends and slidingly received within said insulating members.

35. The fabricated resistor grid of claim 24 wherein said first type of connecting means includes metal pins fixed within said insulating members and slidingly received within holes formed in said "U" shaped bends.

36. The fabricated resistor grid of claim 24 wherein said first type of connecting means includes metal clips received within said insulating members and surrounding the rounded portion of said "U" shaped bends.

37. The fabricated resistor grid of claim 27 wherein at least two zigzag resistors are supported between said first and second insulating members and are spaced laterally from each other.

38. The fabricated resistor grid of claim 28 wherein at least two zigzag resistors are supported between said first and second insulating members and are spaced laterally from each other.

39. The fabricated resistor grid of claim 1 wherein the flat portions of each resistor element are embossed to stiffen said flat portions.

40. The fabricated resistor grid of claim 24 wherein the legs of adjacent resistor elements have offset portions so that when said adjacent resistor elements are positioned substantially parallel to each other, the ends of the legs of said adjacent resistor elements are closer to each other than the full leg portions of said adjacent resistor elements.

41. The fabricated resistor grid of claim 40 wherein said offset portion of adjacent resistor elements are welded directly to each other.

42. The fabricated resistor grid of claim 41 wherein said offset portion of one resistor element is longer than said offset portion of an adjacent resistor element so that a single thickness of sheet metal extends beyond the welded joint of said adjacent resistor elements.

43. The fabricated resistor grid of claim 41 wherein said offset portion of one resistor element has a slot formed therein and said offset portion of an adjacent resistor element has no slot so that the welded connection of said resistor elements is formed within said slot of said one resistor element.

44. The fabricated resistor grid of claim 24 wherein said second type of connecting means comprises slots formed in said insulating members, at least one pin extending transversely of each of said slots, each welded joint having a flat portion to extend into one of said slots, said welded joint flat portion having a hook-shaped indentation formed therein to hook around said pin after said flat portion is inserted into said slot to retain said flat portion within said slot.

45. The fabricated resistor grid of claim 44 wherein said slots formed in said insulating members each have two pins extending transversely thereto and said welded joint flat portion has two hook-shaped indentations to mate with said two pins.

46. The fabricated resistor grid of claim 24 wherein said second type of connecting means comprises slots formed in said insulating members, each welded joint having a flat portion to extend into one of said slots, said welded joint flat portion having a hole formed through it with a pin inserted transversely to said slot through said hole to retain said welded joint flat portion within said slot.

47. The fabricated resistor grid of claim 24 wherein said second type of connecting means comprises oversize slots formed in said insulating members, shoulders formed at diagonally opposite corners of said slots, each welded joint having a flat portion with laterally extending lugs forming a "T" configuration, said flat portions being turned when inserted into said slots so that said lugs clear said shoulders and, after insertion, being turned to move said lugs behind said shoulders to lock said flat portions within said slots.

48. The fabricated resistor grid of claim 24 wherein said securing means comprises two bosses formed on each of said insulating member elements to protrude through holes in said metal frame and locate said insulating member elements relative to said frame and a bolt inserted through said metal frame and threaded into each of said insulating member elements.

49. The fabricated resistor grid of claim 24 wherein said securing means comprises bosses formed on each of said insulating member elements to protrude through holes in said metal frame with push-on grip nuts secured to said bosses.

50. The fabricated resistor grid of claim 24 wherein said securing means comprises a groove formed in each said insulating member element, said groove formed with shoulders extending inwardly at the surface of said element, a flared channel member fixed to said metal frame whereby said insulating member element is slid over said channel member to retain said insulating member element on said metal frame by having said flared channel member extend under said shoulders.

51. The fabricated resistor grid of claim 24 wherein said securing means comprises grooves formed in the edges of each insulating member element, channel members fixed to said metal frame with inwardly extending sidewalls, said insulating member elements being slidable between said channel members whereby said sidewalls enter said grooves and retain said insulating member elements in place against said metal frame.

52. A zigzag electrical resistor comprising:
a plurality of resistor elements formed of sheet metal having at least one "U" shaped bend and not more than four "U" shaped bends in each element, said resistor elements being connected by welded joints to each other to form said zigzag resistor,
a first type of connecting means formed at said "U" shaped bends for connecting said zigzag resistor to insulating members, and
a second type of connecting means formed at said welded joints for connecting said zigzag resistor to insulating members.

53. The zigzag electrical resistor of claim 52 wherein the flat portions of each resistor element are embossed to stiffen said flat portions.

54. The zigzag electrical resistor of claim 52 wherein the legs of adjacent resistor elements have offset portions formed near the ends of said legs so that when said resistor elements are positioned adjacent to each other, the ends of the legs of adjacent resistor elements are closer to each other than the full leg portions of said resistor elements.

* * * * *